United States Patent
Mohammed

(10) Patent No.: US 11,018,555 B2
(45) Date of Patent: May 25, 2021

(54) INDUCTION MOTOR ROTOR COOLING DESIGN

(71) Applicant: SCHAEFFLER TECHNOLOGIES AG & CO. KG, Herzogenaurach (DE)

(72) Inventor: Khaja Sharfuddin Mohammed, Toledo, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 150 days.

(21) Appl. No.: 16/274,842

(22) Filed: Feb. 13, 2019

(65) Prior Publication Data

US 2020/0259397 A1    Aug. 13, 2020

(51) Int. Cl.
*H02K 9/19* (2006.01)
*H02K 17/02* (2006.01)
*H02K 1/20* (2006.01)

(52) U.S. Cl.
CPC ............ *H02K 9/19* (2013.01); *H02K 1/20* (2013.01); *H02K 17/02* (2013.01)

(58) Field of Classification Search
CPC .................................. H02K 9/19; H02K 17/02
USPC ........... 310/166, 167, 54, 60 A, 60 R, 62, 63
See application file for complete search history.

(56) References Cited

U.S. PATENT DOCUMENTS

| | | | |
|---|---|---|---|
| 2015/0188367 A1 | 7/2015 | Vander Lind et al. | |
| 2015/0280525 A1 | 10/2015 | Rippel et al. | |
| 2016/0141921 A1* | 5/2016 | Kubes ............... | H02K 9/19 |
| | | | 310/54 |

FOREIGN PATENT DOCUMENTS

| | | | | |
|---|---|---|---|---|
| JP | 05161312 | * | 6/1993 | ........... H02K 9/22 |
| JP | 2005006429 A | | 1/2005 | |
| JP | 2011101461 A | | 5/2011 | |
| JP | 2011254574 A | | 12/2011 | |
| JP | 2012182952 A | | 9/2012 | |

* cited by examiner

*Primary Examiner* — Terrance L Kenerly
(74) *Attorney, Agent, or Firm* — Brooks Kushman P.C.

(57) ABSTRACT

An induction motor includes a motor shaft, a rotor, and a rotor conductor bar. In some embodiments described herein, the rotor has a first axial side and a second axial side, and is non-rotatably secured to the motor shaft. The rotor includes a rotor core having an interior surface defining a slot extending from the first axial side to the second axial side. The rotor conductor bar is disposed in the slot. The rotor conductor bar and the slot cooperate to define a channel configured to transfer a fluid through the rotor core from the first axial side to the second axial side while directly contacting the rotor conductor bar.

17 Claims, 4 Drawing Sheets

INDUCTION MOTOR ROTOR COOLING DESIGN

TECHNICAL FIELD

The present disclosure relates to an induction motor having features to enhance cooling of the rotor of the motor.

BACKGROUND

Heat can impact the efficiency of a motor. For example, heat produced during operation of the motor can distort the magnetic field of the motor itself, thereby impairing the output of the motor. Particularly with induction motors, most of the heat is produced in the rotor due to the current passing therethrough to generate torque. Heat can therefore impact the torque capabilities of the motor.

SUMMARY

According to one embodiment, an induction motor includes a motor shaft, a rotor, and a rotor conductor bar. The rotor has a first axial side and a second axial side, and is non-rotatably secured to the motor shaft. The rotor includes a rotor core having an interior surface defining a slot extending from the first axial side to the second axial side. The rotor conductor bar is disposed in the slot. The rotor conductor bar and the slot cooperate to define a channel configured to transfer a fluid through the rotor core from the first axial side to the second axial side while directly contacting the rotor conductor bar.

In another embodiment, a system for cooling an induction motor is provided. The system has a motor, a plurality of rotor conductor rods, and a rotor coolant system. The motor has a rotor having a core extending along an axis, and a stator extending along the axis and radially spaced from the rotor. The rotor conductor rods are disposed in the rotor core and are arranged about the axis. The rotor conductor rods are configured to create a magnetic flux via interaction with the stator during movement of the rotor. The rotor coolant system has a plurality of inlets at one end of the rotor, a plurality of outlets at another end of the rotor, and a plurality of channels each fluidly coupling one of the inlets to a respective one of the outlets. The channels are located radially between the rotor conductor rods and the rotor core to enable fluid passing through the channels to directly contact the rotor conductor rods.

In yet another embodiment, a motor includes a rotor having a core, and a rotor conductor rod disposed in the core. A fluid channel is defined between the core and the rotor conductor rod, and the rotor conductor rod directly contacts only a portion of the core. Fluid traveling through the fluid channel contacts the rotor conductor rod.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described in the Background, heat can impact the efficiency of a motor. For example, heat produced by operation of the motor can distort the magnetic field of the motor itself, thereby impairing the output of the motor. With induction motors, most of the heat is produced in the rotor due to the current passing therethrough to generate torque. Heat can therefore impact the torque capabilities of the motor.

In this disclosure, a motor is provided with a channel that allows fluid to cool the rotor to inhibit excess heat from impairing the motor. In embodiments, an induction motor is provided with a liquid cooling system that channels liquid from the housing to rotor conductors. The liquid can directly contact the rotor conductors, which may be the main source of heat. The liquid can pass through the rotor while contacting the rotor conductors, and then can exit the rotor whereupon the liquid is sprayed onto the stator as well.

Figure 1:
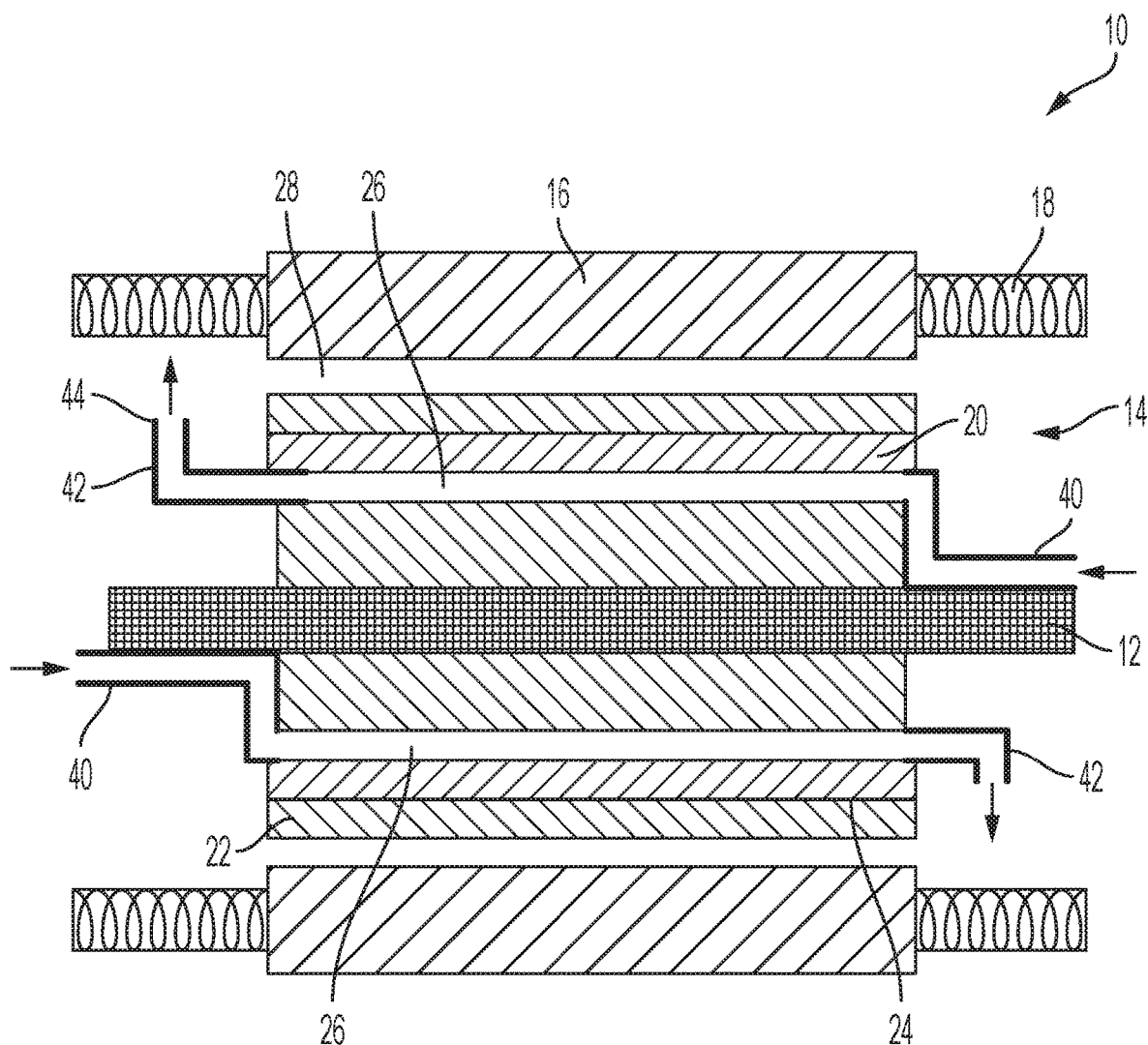
FIG. 1 is a cross-sectional view of a motor having a cooling system, according to one embodiment.

FIG. 1 illustrates a cross-section of a motor 10 with a cooling system which will be described below. The motor 10 may be an induction motor having a motor shaft 12, a rotor 14, and a stator 16. The rotor 14 may be non-rotatably connected to the motor shaft 12 such that it rotates with the motor shaft 12. The stator 16 remains stationary relative to the rotor 14. The stator 16 has windings 18 which reacts with the movement of the rotor 14 to create a magnetic field, and electric current in the rotor necessary to produce torque is obtained by electromagnetic induction from the magnetic field.

Figure 2:
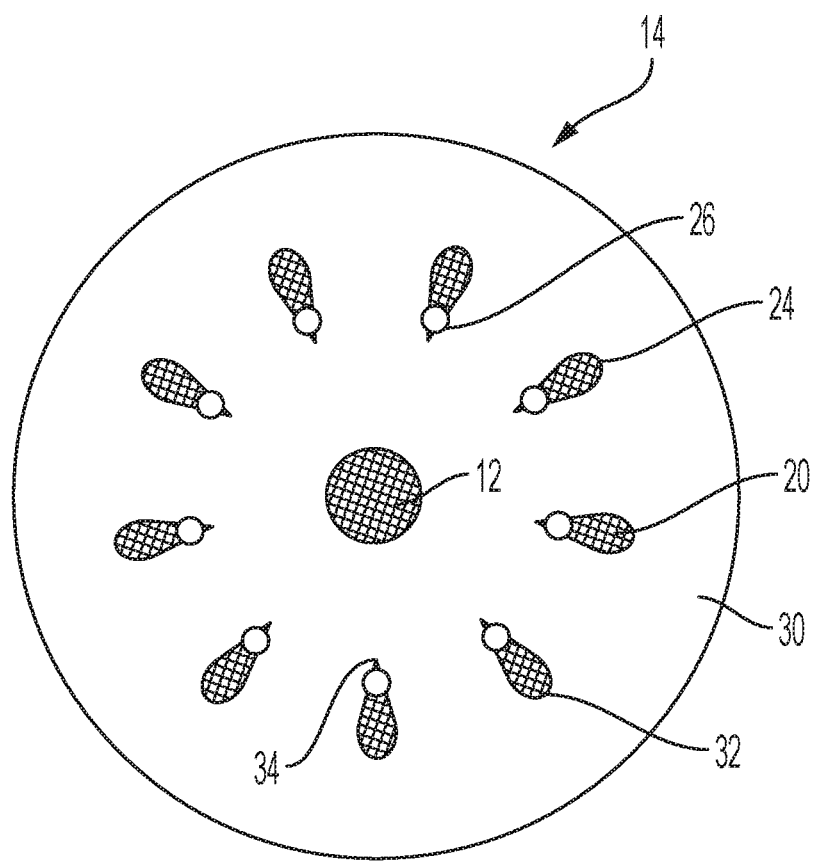
FIG. 2 is an end view of the rotor of the motor of FIG. 1, according to one embodiment.

Referring to FIGS. 1-2, in one embodiment, the rotor 14 is provided with rotor conductor bars 20, also referred to as rotor bars or conductor bars. The rotor conductor bars 20 are arranged circumferentially about the central axis of the rotor. The rotor conductor bars 20 may be shaped in various designs to give different speed-torque characteristics. The distribution (e.g., amount, separation, etc.) of the rotor conductor bars 20 may vary depending on the frequency of the induced current.

To accommodate the rotor conductor bars 20, the rotor 14 has a core 22 with a slot 24 defined therein. The rotor 14 may be provided with a plurality of slots 24 arranged about the central axis, and each slot 24 has a respective one of the rotor conductor bars 20 disposed therein. The rotor conductor bars 20 may be made of copper or other conducting material, such that a magnetic field is created due to the passing of the rotor conductor bars 20 past the windings 18 of the stator. An air gap 28 may be provided radially between the rotor 14 and the stator 16 to enable relative rotation of the rotor 14 and facilitate creation of the magnetic field during operation of the motor.

As shown in FIG. 2, rotor 14 may have an end face 30. Each of the slots 24 may have a larger cross-sectional area than its encompassed rotor conductor bar 20 such that a gap or channel 26 is provided radially between the rotor conductor bar 20 and the rotor core 22. For example, in the embodiment shown in FIG. 2, the slots 24 are tear-drop shaped with a rounded outer end 32 and a narrowed inner end 34. Each rotor conductor bar 20 is rounded such that it fits in contact with the rounded outer end 32 of the slot 24, but does not contact the narrowed inner end 34 of the slot 24. The gap between the rotor conductor bar 20 and the narrowed inner end 34 provides the channel 26.

While the embodiment illustrated in FIGS. 1-2 shows the rotor conductor bars 20 located radially outward from the channel 26, in other embodiments the rotor conductor bars 20 are located radially inward from the channel 26. In those embodiments, the tear-drop shape of the slots 24 may be reversed such that the inner end is rounded and the outer end is narrowed.

The channel 26 is a fluid channel, enabling fluid to enter the rotor 14 through one axial side and exit the rotor 14 through another axial side. The fluid acts as a coolant, directly contacting the rotor conductor bars 20 as it passes through the rotor 14. As the rotor conductor bars 20 may be main sources of heat during operation of the motor 10, coolant directly contacting the rotor conductor bars 20 provides effective cooling.

To route the coolant, the rotor 14 may be provided with a plurality of inlet and outlet tubes for each channel. For example, inlet tubes 40 may be provided to guide the fluid into the channel 26. Once the fluid has traveled axially through the rotor 14, outlet tubes 42 define a prescribed outlet path for the fluid. The inlet tubes 40 and outlet tubes 42 may be plastic, metal, or rubber and are configured to withstand temperature gradients as the fluid is cooled therethrough. The tubes 40, 42 may also be fixed to the axial sides of the rotor 14 by adhesives, press-fits, or other suitable connections.

The inlet tubes 40 may be fixed to the motor shaft 12 and travel axially along the rotor shaft 12. Once reaching the rotor 14, the inlet tube 40 may travel radially along the end face of the rotor 14 until reaching the channel 26. The tube 40 may end at the channel 26 (or travel slightly within the channel) so that the coolant can directly contact the rotor conductor bars 20.

The outlet tubes 42 may be fixed to the opposite end face of the rotor 14. The outlet tube 42 may receive the fluid from the channel 26. In one embodiment, the outlet tube 42 is configured to spray the fluid directly onto the stator 16, such as the windings 18 of the stator 16. For example, the outlet tube 42 may have an opening or outlet 44 that faces the windings 18 and is positioned in close proximity thereto. As the coolant exits the rotor 14 through the outlet tube 42, the coolant is then sprayed onto the windings 18. This enables both the rotor conductor bars 20 and the windings 18 to be simultaneously cooled in the same coolant system.

As shown in FIG. 1, each end face of the rotor may have both inlet tubes and outlet tubes. The inlets and outlets can be alternating along the end face. For example, in one embodiment the rotor can be provided with ten slots 24, ten corresponding rotor conductor bars 20 arranged about the central axis, and therefore ten corresponding channels 26. Five of the channels 26 may transfer fluid in one axial direction, and the other five of the channels 26 may transfer fluid in the other axial direction. On each end face, the fluid enters five of the channels, but exits out of the other five channels.

While not illustrated herein, at least a portion of the interior surface of the rotor core defining the channels 26 may be machined with surface features that produce a spiraling movement of the fluid within the rotor core. This can enhance cooling by allowing the fluid to travel along more surface area of the rotor conductor bars while moving from one axial side to the other axial side of the rotor.

Figure 3:
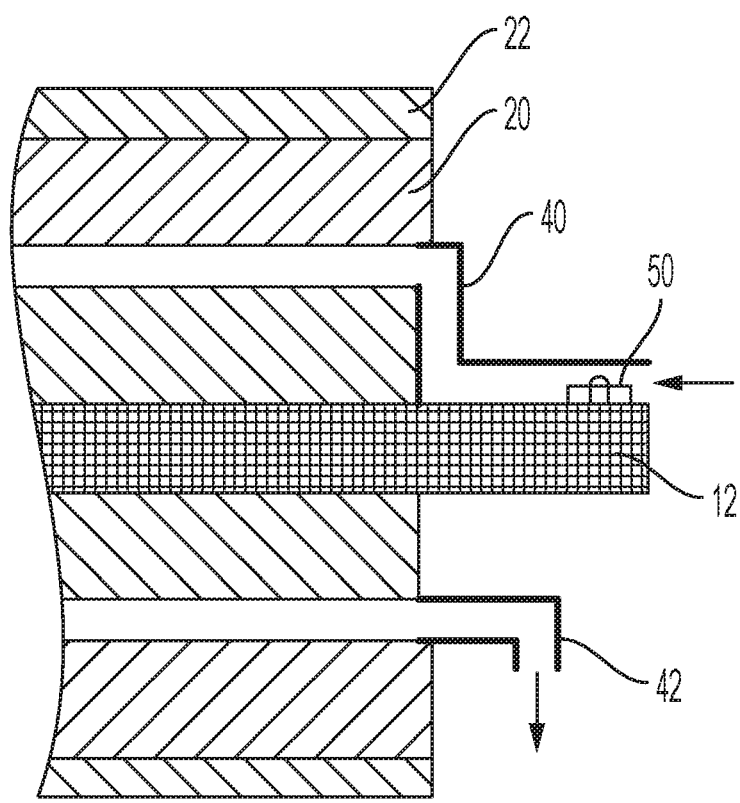
FIG. 3 is an enlarged cross-sectional view of a portion of FIG. 1, with a bearing disposed on the motor shaft, according to one embodiment.

FIG. 3 illustrates an embodiment in which a motor shaft bearing is cooled by the fluid. In one embodiment, the motor shaft 12 is provided with a bearing 50 which rotatably couples the motor shaft 12 to another component. The bearing 50 may be at least partially located within the inlet tube 40. Alternatively, the bearing 50 may be located axially outside but in close proximity with the inlet tube 40 such that when the fluid is forced into the inlet tube 40 is passes over or near the bearing 50. This allows the coolant to first cool the bearing, then cool the rotor conductor bar 20 before exiting the rotor 14.

Figure 4:
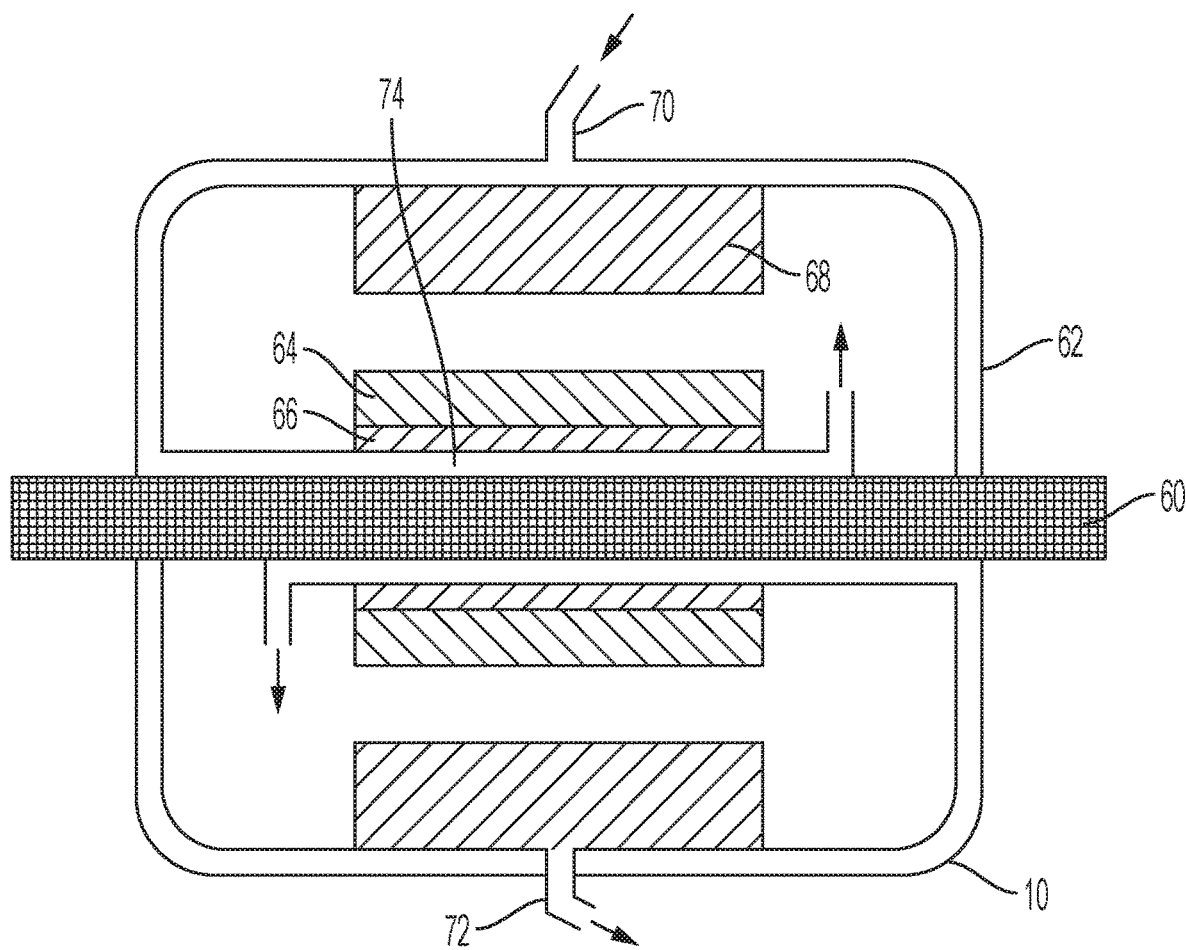
FIG. 4 is a cross-sectional view of a motor within a housing that incorporates a cooling system, according to one embodiment.

FIG. 4 illustrates another embodiment of a motor having a cooling system. The motor includes a central motor shaft 60. The motor is housed within a housing 62, which the motor shaft 60 passes through. Once again, the motor may have a rotor 64, rotor conductor rods 66, and a stator 68. The housing 62 may be provided with an inlet 70 and an outlet 72. The coolant liquid can be introduced to the housing 62 via the inlet 70 and can be exited from the housing 62 via the outlet 72. The coolant enters through the inlet 70, passes through the channel 74 to cool the rotor conductor rods 66, and exits through the outlet 72.

This Figure also illustrates an embodiment in which the channel 74 is defined radially between the central motor shaft 60 and the rotor conductor rod 66. The coolant maintains direct contact with the rotor conductor rod 66 while also cooling the central motor shaft 60.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 motor
12 motor shaft
14 rotor
16 stator
18 windings
20 rotor conductor rods
22 rotor core
24 slot
26 channel
28 air gap
30 end face
32 outer end of slot
34 inner end of slot
40 inlet tube
42 outlet tube
44 outlet
50 bearing
60 motor shaft
62 housing
64 rotor
66 rotor conductor rod
68 stator
70 inlet
72 outlet
74 channel

What is claimed is:

1. An induction motor comprising:
a motor shaft;
a rotor having a first axial side and a second axial side, the rotor being non-rotatably secured to the motor shaft, the rotor including a rotor core having an interior surface defining a slot extending from the first axial side to the second axial side;
a rotor conductor bar disposed in the slot;
a stator having windings;
an inlet tube coupled to the first axial side of the rotor;
an outlet tube coupled to the second axial side of the rotor;
wherein the rotor conductor bar and the slot cooperate to define a channel configured to transfer a fluid through the rotor core from the first axial side to the second axial side while directly contacting the rotor conductor bar, wherein the inlet tube is configured to deliver the fluid to the channel, and wherein the outlet tube extends outside of the rotor core and is configured to direct the fluid onto the windings.

2. The induction motor of claim 1, wherein the fluid directly contacts the rotor conductor bar and the interior surface of the rotor core.

3. The induction motor of claim 1, wherein the rotor core defines a second slot extending from the first axial side to the second axial side, the induction motor further comprising a second rotor conductor bar disposed in the second slot, and wherein the second rotor conductor bar and the slot cooperate to define a second channel configured to transfer the fluid through the rotor core from the second axial side to the first axial side while directly contacting the rotor conductor bar.

4. The induction motor of claim 3, further comprising a second inlet tube coupled to the second axial side of the rotor and configured to deliver the fluid to the second channel.

5. The induction motor of claim 4, further comprising a second outlet tube coupled to the first axial side of the rotor and configured to transfer the fluid from the second channel and spray the fluid on the stator windings.

6. The induction motor of claim 1, wherein at least a portion of the interior surface of the rotor core is machined with surface features configured to produce a spiraling movement of the fluid within the rotor core to enhance cooling.

7. A system for cooling an induction motor, the system comprising:
a motor having:
a rotor having a core and extending along an axis,
a stator extending along the axis and radially spaced from the rotor, and
a plurality of rotor conductor rods disposed in the rotor core and arranged about the axis, wherein the rotor conductor rods are configured to create a magnetic flux via interaction with the stator during movement of the rotor; and
a rotor coolant system having:
a plurality of inlets at one end of the rotor,
a plurality of outlets at another end of the rotor,
a plurality of channels each fluidly coupling one of the inlets to a respective one of the outlets, wherein the channels are located radially between the rotor conductor rods and the rotor core to enable fluid passing through the channels to directly contact the rotor conductor rods,
wherein the inlets include at least one inlet tube extending axially away from the rotor, wherein the outlets include at least one outlet tube extending axially away from the rotor, and wherein the outlet tube includes an opening that faces the stator.

8. The system of claim 7, wherein the inlets include at least one inlet tube extending axially away from the rotor.

9. The system of claim 8, wherein the at least one inlet tube is coupled to a central shaft of the motor.

10. The system of claim 7, wherein the outlets include at least one outlet tube extending axially away from the rotor.

11. The system of claim 10, wherein the at least one outlet tube includes an opening that faces the stator.

12. The system of claim 11, wherein the stator includes windings, and the opening faces the windings such that the fluid is sprayed over the windings during operation of the rotor coolant system.

13. A motor comprising:
a rotor having a core;
a rotor conductor rod disposed in the core, wherein a fluid channel is defined between the core and the rotor conductor rod, and wherein the rotor conductor rod directly contacts only a portion of the core;
a stator having windings radially spaced from the rotor; and
an outlet tube extending axially beyond the core and turned to have an outlet that faces the windings to enable the fluid to spray over the windings to cool the windings;
wherein fluid traveling through the fluid channel contacts the rotor conductor rod.

14. The motor of claim 13, wherein the core has an interior surface defining a slot, wherein the rotor conductor rod is disposed in the slot, and wherein the interior surface is larger than an exterior surface of the rotor conductor rod such that the fluid channel is defined between the interior surface of the core and the exterior surface of the rotor conductor rod.

15. The motor of claim 14, wherein the rotor has a second interior surface defining a second slot, and the motor further includes a second rotor conductor rod disposed in the second slot and a second channel is defined between the second interior surface and the second rotor conductor rod, wherein fluid travels through the second channel in an axial direction opposite than the fluid traveling through the fluid channel.

16. The motor of claim 14, wherein at least a portion of the interior surface of the core is machined with surface features configured to produce a spiraling motion of the fluid within the core to increase surface area of the rotor core that the fluid contacts.

17. The motor of claim 13, further comprising an inlet tube configured to transfer the fluid into the fluid channel.

\* \* \* \* \*